(12) United States Patent
Auerbach

(10) Patent No.: US 12,139,314 B2
(45) Date of Patent: Nov. 12, 2024

(54) SYSTEM FOR STORING AND PROCESSING HERBS

(71) Applicant: Michael Auerbach, Yorba Linda, CA (US)

(72) Inventor: Michael Auerbach, Yorba Linda, CA (US)

(*) Notice: Subject to any disclaimer, the term of this patent is extended or adjusted under 35 U.S.C. 154(b) by 267 days.

(21) Appl. No.: 17/706,907

(22) Filed: Mar. 29, 2022

(65) Prior Publication Data

US 2022/0234795 A1     Jul. 28, 2022

Related U.S. Application Data

(63) Continuation of application No. 29/768,363, filed on Jan. 28, 2021, now Pat. No. Des. 992,959.

(51) Int. Cl.
| | | |
|---|---|---|
| *B65D 50/04* | (2006.01) | |
| *A47J 42/34* | (2006.01) | |
| *B65D 51/24* | (2006.01) | |
| *B65D 53/02* | (2006.01) | |

(52) U.S. Cl.
CPC ............ *B65D 50/043* (2013.01); *A47J 42/34* (2013.01); *B65D 51/24* (2013.01); *B65D 53/02* (2013.01)

(58) Field of Classification Search
CPC ...... B65D 50/043; B65D 51/24; B65D 53/02; A47J 43/34
USPC .................................................. 220/200, 522
See application file for complete search history.

(56) References Cited

U.S. PATENT DOCUMENTS

| | | | | |
|---|---|---|---|---|
| 2,187,029 A | * | 1/1940 | Hevers .................... | A47G 19/16 206/0.5 |
| 3,790,014 A | * | 2/1974 | Mucsi .................. | B65D 50/043 215/221 |
| 3,974,928 A | * | 8/1976 | Domaracki ............ | B65D 41/06 215/350 |
| 3,990,577 A | * | 11/1976 | Delia ..................... | A45D 40/00 40/538 |
| 4,159,779 A | * | 7/1979 | Hedgewick .......... | B65D 50/043 215/214 |
| 6,269,968 B1 | * | 8/2001 | Belcastro ........... | A47G 19/2272 220/717 |

(Continued)

FOREIGN PATENT DOCUMENTS

| | | | | | |
|---|---|---|---|---|---|
| CN | 107902196 A | * | 4/2018 | ............... | B65D 1/12 |
| CN | 113371328 A | * | 9/2021 | | |

*Primary Examiner* — J. Gregory Pickett
*Assistant Examiner* — Niki M Eloshway
(74) *Attorney, Agent, or Firm* — Camuti Law Group, APC; Nathan Camuti

(57) ABSTRACT

There is provided a system for storing and processing herbs including a container having a base and one or more sidewalls defining a volume, an aperture defined by the upper end of the one or more sidewalls, and a lid removably attached to the upper end of the container, the lid covering the aperture when the container is in a closed configuration. The lid includes an inner portion including a working surface. The working surface includes a bowl having a concave transition from a base of the bowl to a lip of the bowl, the lip of the bowl has a convex transition between the bowl and a bowl rim, and the bowl rim defines an intersection between the working surface and the external surface. The working surface also includes a channel for guiding a processed granular material out of the bowl in a focused distribution stream.

17 Claims, 3 Drawing Sheets

(56) References Cited

U.S. PATENT DOCUMENTS

| | | | |
|---|---|---|---|
| 10,631,675 B1* | 4/2020 | Ellsworth | B65D 51/24 |
| 2019/0031424 A1* | 1/2019 | Nickerson | B65D 51/24 |
| 2020/0122907 A1* | 4/2020 | Campbell | B65D 51/24 |

* cited by examiner

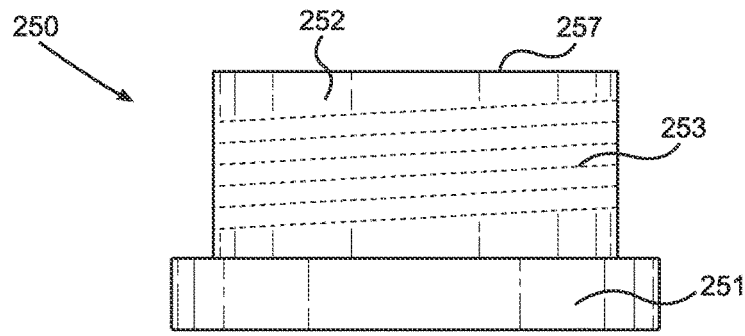
FIG. 2
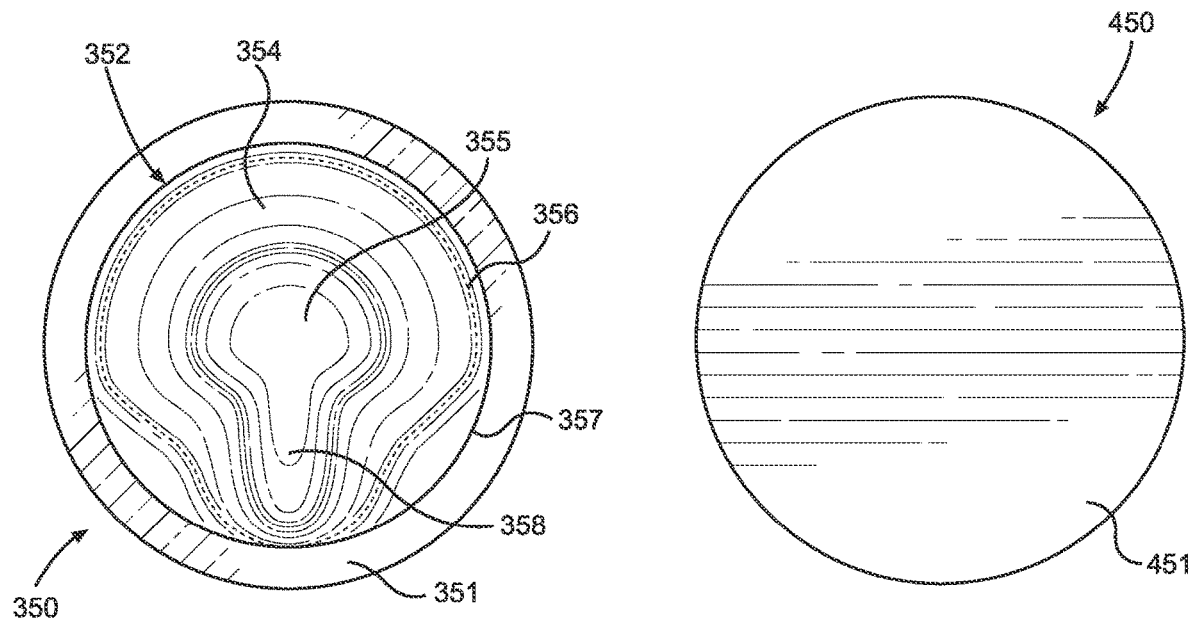
FIG. 3
FIG. 4
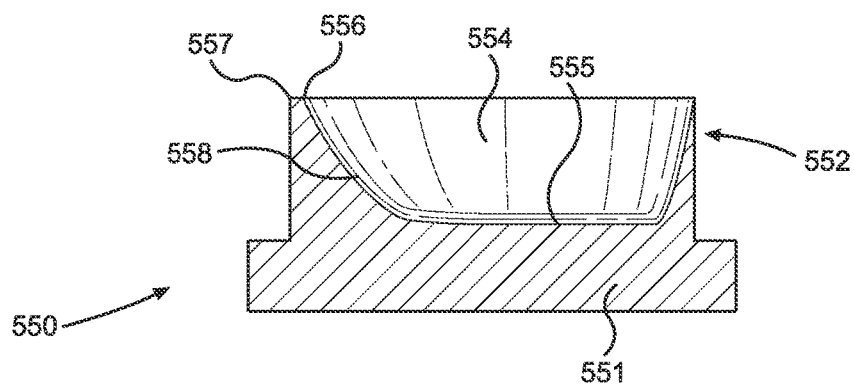
FIG. 5

SYSTEM FOR STORING AND PROCESSING HERBS

RELATED APPLICATION(S)

The present application claims the benefit of and priority to a U.S. Design patent application Ser. No. 29/768,363, filed Jan. 28, 2021, which is hereby incorporated by reference in its entirety into the present application.

BACKGROUND

Storing and processing herbs for consumption is generally a multi-step process requiring multiple tools in addition to having a supply of herbs that must be properly stored in a container. Airtight containers are generally preferred for storing herbs as those best preserve the freshness, aroma, and flavor of the herbs. Additionally, processing herbs generally require tools such as a bulky multi-part herb grinder and a solid surface on which to process the herbs that often has residue build-up from previously processed herbs lodged in the corners and crevices. Carrying around the container(s) of herbs along with the other tools each and every time to process the herbs is inconvenient and cumbersome. A convenient system for storing and processing herbs is needed.

SUMMARY

The present disclosure is directed to systems for storing and processing herbs, substantially as shown in and/or described in connection with at least one of the figures, as set forth more completely in the claims.

In some embodiments, the present disclosure includes a system for storing and processing herbs comprising a container having a base and one or more sidewalls extending upwards from the base and comprising an engagement interface at an upper end of the one or more sidewalls opposite the base wherein the base and the one or more sidewalls define a volume, the upper end of the one or more sidewalls defining an aperture, and a lid removably attached to the upper end of the one or more sidewalls, the lid covering the aperture when the system is in a closed configuration. The lid comprises an outer portion including an external surface, an engagement element that interfaces with the container to form the removable attachment, and an inner portion comprising a working surface, wherein the working surface comprises a bowl having a concave transition from a base of the bowl to a lip of the bowl, wherein the lip of the bowl is a convex transition between the bowl and a bowl rim, and the bowl rim defines an intersection between the working surface and the external surface. The working surface further comprises a channel for guiding a processed granular material out of the bowl in a focused distribution stream. When the container and the lid are in the closed configuration, the working surface faces inward towards the volume defined by the base and the one or more sidewalls of the container.

In some embodiments, the lid and base are circular and the container is cylindrical.

In some embodiments, the working surface is smooth to prevent accumulation of build-up of residues from herbs processed on the working surface.

In some embodiments, the external surface of the lid includes an engagement element for engaging with the engagement interface of the one or more sidewalls by a complementary engagement mechanism.

In some embodiments, the complementary engagement mechanism is one of a threaded engagement, a friction-fit, a pressure-fit, a suction, a hinge, a latch, and a clamp.

In some embodiments, the engagement element is comprised of a gasket, wherein the gasket is one of a rubber material and a silicone material.

In some embodiments, the container and the lid are made of one of a wood, a metal, a glass, and a plastic.

In some embodiments, the channel is a further recessed section of the working surface extending from a center of the working surface to the bowl rim, and wherein the channel is wider at the center of the working surface and tapers to be narrower at the bowl rim.

In some embodiments, the system further comprises a foundation element coupled to the outer portion, wherein a surface area of a base of the foundation element is greater than a surface area of an area bounded by the external surface, and wherein the foundation element has one or more flat surfaces for providing stability when the lid is placed on one of a tabletop, a work bench, and a flat surface.

In some embodiments, the foundation element further comprises a gripping mechanism, wherein the gripping mechanism is one of a strip, a tape, and a sleeve.

In some embodiments, the gripping mechanism is made of a non-slip material, wherein the non-slip material is one of a rubber, a silicone, and a polyvinyl chloride.

In some embodiments, the present disclosure includes a vessel for processing herbs, comprising an outer portion comprising an external surface, an inner portion comprising a working surface, wherein the working surface comprises a bowl having a concave transition from a base of the bowl to a lip of the bowl, wherein the lip of the bowl is a convex transition between the bowl and a bowl rim, the bowl rim defining the intersection between the working surface and the external surface, and wherein the working surface further comprises a channel for guiding a processed granular material out of the bowl in a focused distribution stream.

In some embodiments, the channel is a further recessed section of the working surface extending from a center of the working surface to the bowl rim, and wherein the channel is wider at the center of the working surface and tapers to be narrower at the bowl rim.

In some embodiments, the vessel further comprises a foundation element coupled to the outer portion, wherein a surface area of a base of the foundation element is greater than a surface area of a base of the outer portion, and wherein the foundation element has one or more flat surfaces for providing stability when the lid is placed on one of a tabletop, a work bench, and a flat surface.

In some embodiments, the foundation element further comprises a gripping mechanism, wherein the gripping mechanism is one of a strip, a tape, and a sleeve.

In some embodiments, the gripping mechanism is made of a non-slip material, wherein the non-slip material is one of a rubber, a silicone, and a polyvinyl chloride.

BRIEF DESCRIPTION OF THE DRAWINGS

FIG. 2 shows a diagram of a side perspective view of an exemplary lid for use with the system shown in FIG. 1, according to one embodiment of the present disclosure;

FIG. 3 shows a diagram of a top perspective view of an exemplary lid for use with the system shown in FIG. 1, according to one embodiment of the present disclosure;

FIG. 4 shows a diagram of a bottom perspective view of an exemplary lid for use with the system shown in FIG. 1, according to one embodiment of the present disclosure; and FIG. 5 shows a diagram of a cross-sectional side view of an exemplary lid for use with the system shown in FIG. 1, according to one embodiment of the present disclosure.

DETAILED DESCRIPTION

Figure 1:
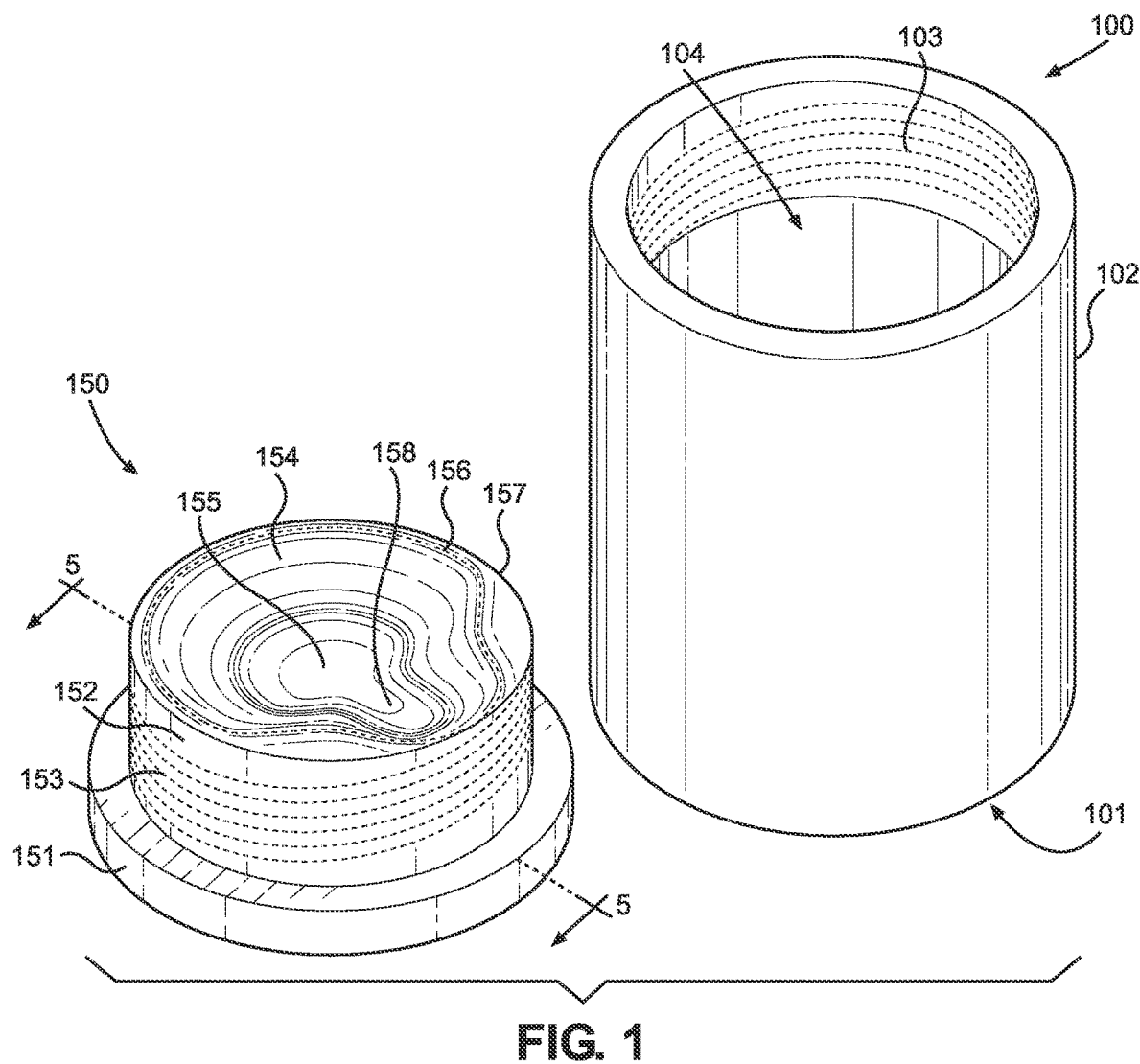
FIG. 1 shows a diagram of an exemplary system for storing and processing herbs, according to one embodiment of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale and are not intended to correspond to actual relative dimensions.

FIG. 1 shows a diagram of an exemplary system for storing and processing herbs, according to one embodiment of the present disclosure. Container 100 includes a base 101 with a sidewall 102 extending upwards from base 101 defining a volume. In some embodiments, herbs may be placed for storage within the defined volume. In some embodiments, there may be one or more sidewalls 102 extending upwards from the base 101. An engagement interface 103 is located at an upper end of the of sidewall 102. In the depicted embodiment, engagement interface 103 is threaded. The upper end of sidewall 102 defines an aperture 104. In different embodiments, container 100 is made of one of a wood, a metal, a glass, and a plastic. In some embodiments, the metal may be a stainless steel. In some embodiments, the metal may be an aluminum. In some embodiments, the metal may be a combination of a plurality of metals. In some embodiments, container 100 is made of a recyclable material.

In the depicted embodiment, lid 150 is removably installed in the upper end of sidewall 102. As depicted in FIG. 1, lid 150 is removed from container 100. When attached, lid 150 covers aperture 104 resulting in a closed configuration. Lid 150 includes an outer portion comprising external surface 152. External surface 152 interfaces with sidewall 102 forming the removable attachment between lid 150 and container 100. In some embodiments, external surface 152 includes engagement element 153 to engage with engagement interface 103 by a complementary engagement mechanism. In some embodiments, complementary engagement mechanism is one of a threaded engagement, a friction-fit, a pressure-fit, a suction, a hinge, a latch, and a clamp. In yet another embodiment, engagement element 153 includes a gasket made of one of a rubber material and a silicone material for a substantially airtight fit or closure to maintain the freshness of the herbs stored in the system. In some embodiments, the complementary engagement mechanism is a child-proof opening mechanism. In some embodiments, the child-proof opening mechanism includes foundation element 151 that can rotate around external surface 152. In some embodiments with the child-proof-opening mechanism, when in a closed configuration, pressure can be applied on foundation element 151 towards base 101 of container 100 to engage an interlocking mechanism that creates traction and allows lid 150 to become unscrewed. In some embodiments with the child-proof opening mechanism, when no pressure is applied, foundation element 151 rotates loosely around externa surface 152 but does not engage the interlocking mechanism and lid 150 cannot be unscrewed and removed from container 100. Other examples of child-proof lids include squeeze-and-turn type lids and line-up-the-arrows type lids.

In some embodiments lid 150 is circular, and sidewall 102 of container 100 is cylindrical. In other embodiments, lid 150 includes foundation element 151 having one or more flat surfaces so that lid 150 will not tilt or roll off when placed on a tabletop, a work bench, a flat surface, or the like. In some embodiments, foundation element 151 has a diameter that is greater than a diameter of an area enclosed by external surface 152 such that there is greater stability when lid 150 is removed and placed on the tabletop, the work bench, or a flat surface to be used to process the herbs. In other embodiments, the diameter of a base of foundation element 151 is substantially similar to an outer diameter of container 100, and a diameter of an area enclosed by external surface 152 is substantially similar to a diameter of aperture 104 so that when lid 150 is placed into aperture 104 and engagement element 153 is complementarily engaged with engagement interface 103, the diameter of foundation element 151 is positioned substantially flush with the outer diameter of container 100. This helps secure the contents and maintain the freshness of the herbs stored in the system.

Lid 150 further comprises an inner portion comprising a working surface in which the herbs are processed into a granular material. In this embodiment, the working surface of lid 150 is comprised of a bowl 154 and a channel 158. Bowl 154 has a concave shape from a base 155 of the bowl 154 to a lip 156 of the bowl 154 defining a bowl volume. Base 155 of the bowl 154 is the lowest, deepest point of bowl 154. A depth of bowl 154 is defined by a greatest height measured from base 155 of the bowl 154 to lip 156 of the bowl 154. Lip 156 of the bowl 154 has a convex-shaped transition from bowl 154 to bowl rim 157. Bowl rim 157 is the intersection between the working surface of lid 150 and external surface 152 of the outer portion.

The working surface of lid 150 further includes channel 158 in which to gather the herbs that have been processed into granular material in bowl 154. Channel 158 serves as a conduit for guiding the processed granular material out of bowl 154 in a focused distribution stream. In some embodiments, channel 158 is a further recessed section of the working surface of lid 150 extending from a center of the working surface of lid 150 to bowl rim 157. In some embodiments, channel 158 is wider at a center of the working surface of lid 150 and tapers to be narrower at bowl rim 157. Channel 158 that tapers towards bowl rim 157 serves to help with the transfer of the processed granular material from lid 150 to another vessel or surface. In different embodiments, the working surface of lid 150 may include one or more channels to separate different herbs that are processed in bowl 154 or mix different herbs with different proportions. Additionally, having more than one channel 158 may also help to minimize contamination or mixing of granular material from different herbs by having dedicated channels for the different herbs. When lid 150 is installed in container 100 resulting in closed configuration, the working surface of lid 150 faces inward towards the volume defined by sidewall 102 extending upwards from base 101. In different embodiments, lid 150 is made of one of a wood, a metal, a glass, and a plastic. In some embodiments, the metal may be a stainless steel. In some embodiments, the metal may be an aluminum. In some embodiments, the metal may be a combination of a plurality of metals. In some embodiments, lid 150 is made of a recyclable material. FIG. 2 shows a diagram of a side perspective view of an exemplary lid for use with the system shown in FIG. 1, according to one embodiment of the present disclosure. Only one side perspective view of lid 250 is depicted because a front perspective view, a back perspective view, a left side perspective view, and a right side perspective view of lid 250 are substantially similar. In the depicted embodiment, lid 250 includes foundation element 251 and external surface 252 of an outer portion of lid 250. The outer portion of lid 250 is comprised of external surface 252. A base of the outer portion of lid 250 is equivalent to a bottom of external surface 252. In the depicted embodiment, the bottom of external surface 252 is coupled in direct contact with a top surface of foundation element 251. From the depicted side view, foundation element 251 has a diameter greater than a diameter of an area enclosed by external surface 252. The greater diameter and surface area covered by foundation element 251 thereby provides greater stability to lid 250, particularly while the herbs are being processed in a working surface (not pictured) of lid 250. Foundation element 251 increases stability because it distributes a weight of lid 250 structure over a larger surface area to minimize any rocking back and forth movement and prevents lid 250 from tipping or flipping over, particularly while the herbs are being actively processed in the working surface of lid 250. External surface 252 has a height that extends from a top of foundation element 251 up to bowl rim 257 defining a volume which houses the working surface of lid 250. Additionally, foundation element 251 and external surface 252 may further serve as surfaces for the user to grip onto or hold onto or hold down so that lid 250 does not move or slip around on a tabletop, a work bench, or a flat surface.

The figure also depicts engagement element 253 on external surface 252. In the depicted embodiment, engagement element 253 is a threaded element. In other embodiments, engagement element 253 may be one of a right-handed threaded element, a left-handed threaded element, a male thread element, a female thread element, a latch, and a gasket. Engagement element 253 is adapted to engage with an engagement interface (not pictured) by a complementary engagement mechanism. In some embodiments, the complementary engagement mechanism is one of a threaded engagement, a friction-fit, a pressure-fit, a suction, a hinge, a latch, and a clamp.

FIG. 3 shows a diagram of a top perspective view of an exemplary lid for use with the system shown in FIG. 1, according to one embodiment of the present disclosure. In the depicted embodiment, a diameter of foundation element 351 is greater than a diameter of bowl rim 357. Bowl rim 357 defines an intersection transition between a working surface of lid 350 and external surface 352. As depicted, the diameter of bowl rim 357 is substantially equal to a diameter of an area enclosed by external surface 352. In other embodiments, the diameter of an area enclosed by external surface 352 is greater than the diameter of bowl rim 357. In other embodiments, the diameter of an area enclosed by external surface 352 is less than the diameter of bowl rim 357. In the depicted embodiment, the diameter of an area enclosed by external surface 352 is substantially centered on foundation element 351 such that a visible area of foundation element 351 has substantially an equal distance between external surface 352 to the outermost edge of foundation element 351 around an entire circumference. The depicted embodiment shows a circular foundation element 351. In other embodiments, foundation element 351 is one of a circle, an oval, a triangle, a square, a rectangle, a rhombus, a pentagon, a hexagon, a heptagon, an octagon, a nonagon, a decagon, and other geometric shape. In yet another embodiment, foundation element 351 has a non-geometric shape. The different shapes of contemplated embodiments of foundation element 351 may provide for different holding or gripping points to steady lid 350 when processing herbs in the working surface of lid 350 so that lid 350 does not move or slip around on a tabletop, a work bench, or a flat surface. Foundation element 351 has a surface area greater than the surface area covered by an area enclosed by external surface 352, which increases stability because it distributes a weight of the lid 350 structure over a larger surface area to minimize any wobbling movement while processing herbs in the working surface of lid 350 and to prevent lid 350 from tipping over and spilling contents in the working surface of lid 350.

The working surface of lid 350 is located within a volume defined by a bottom of external surface 352 extending upwards to the bowl rim 357. A base of an outer portion of lid 350 is equivalent to a bottom of external surface 352, which is defined by the area enclosed by external surface 352. According to one embodiment of the present disclosure, the working surface of lid 350 is comprised of bowl 354 and channel 358. The volume defined by the bottom of external surface 352 extending upwards to bowl rim 357 is greater than a volume defined by a combination of bowl 354 and channel 358. In some embodiments, bowl 354 is a concave shape with a radial transition from base 355 of bowl 354 transitioning to the side sloping upwards to lip 356 of bowl 354. In some embodiments, bowl 354 is a concave, semi-hemispherical vessel, wherein a transition from base 355 of bowl 354 to lip 356 of bowl 354 is substantially concave. In some embodiments, the transition from base 355 of bowl 354 to lip 356 of bowl 354 is one of a radial transition, a parabolic transition, a hyperbolic transition, and an exponential transition. A transition from lip 356 of bowl 354 to bowl rim 357 is a substantially convex transition. Bowl rim 357 is the intersection between the working surface of lid 350 and external surface 352. Further, channel 358 of the working surface of lid 350 is a further recessed portion of the working surface of lid 350 that extends from a center of the working surface of lid 350 up towards bowl rim 357. According to one embodiment, channel 358 is wider at the center of the working surface of lid 350 and tapers to a narrower width at bowl rim 357. Channel 358 serves as a conduit for gathering and guiding the processed herbs out of the working surface of lid 350 in a focused distribution stream. Other embodiments may include more than one channel to separate out different ingredients that may be processed in the working surface of lid 350.

The working surface of lid 350 is substantially smooth to prevent accumulation of build-up of residues from herbs processed on the working surface of lid 350. In one preferred embodiment of the present disclosure, the working surface of lid 350 is adapted for processing of dried plants. In other embodiments, processing of the herbs on the working service may further include wet ingredients including water, oil, butter, and any combinations thereof. The herbs processed in lid 350 include whole plants and parts thereof, including botanicals, bark, flowers, seeds, roots, stems, fruits, and any combinations thereof. The uses of the processed herbs include food spices and seasonings, medicinal use, therapeutic use, and recreational drug use. In preferred embodiments, the herbs are already dried prior to processing in the working surface of lid 350. In different embodiments, processing in the working surface of lid 350 may include grating, crumbling, shredding, grinding, sifting, and any combinations thereof. In some embodiments, bowl 354 having a concave shape includes a marking or a plurality of markings to indicate one or more volume measurement units, such as one teaspoon, one tablespoon, one cup, and the like.

FIG. 4 shows a diagram of a bottom perspective view of an exemplary lid for use with the system shown in FIG. 1, according to one embodiment of the present disclosure. Specifically, a bottom view of foundation element 451 of lid 450 is shown. In the depicted embodiment, foundation element 451 is a substantially circular shape. In other embodiments, foundation element 451 is one of a circle, an oval, a triangle, a square, a rectangle, a rhombus, a pentagon, a hexagon, a heptagon, an octagon, a nonagon, a decagon, and other geometric shape. In yet another embodiment, foundation element 451 has a non-geometric shape. In a preferred embodiment, a surface area of a base of foundation element 451 is greater than a surface area enclosed by an external surface (not pictured in FIG. 4) for added stability, particularly when processing herbs in a working surface of lid 450. In other embodiments, foundation element 451 is further comprised of a gripping mechanism to prevent lid 450 from slipping when placed on a tabletop, a work bench, or flat surface to process herbs in the working surface of lid 450. In different embodiments, the gripping mechanism is one of a strip, a tape, and a sleeve, wherein the gripping mechanism is made of a non-slip material. The non-slip material may be one of a rubber, a silicone, and a polyvinyl chloride.

FIG. 5 shows a diagram of a cross-sectional side view of an exemplary lid for use with the system shown in FIG. 1, according to one embodiment of the present disclosure. In the depicted embodiment, lid 550 is comprised of foundation element 551 and the working surface of lid 550, wherein the working surface of lid 550 is comprised of bowl 554 and channel 558. In the depicted embodiment, bowl 554 has a substantially concave shape that transitions from base 555 of bowl 554 to lip 556 of bowl 554. Further, the depicted embodiment shows that lip 556 of bowl 554 is a convex transition between bowl 554 and bowl rim 557. In the depicted embodiment, channel 558 extends from a center of the working surface of lid 550 towards lip 556 of bowl 554 and bowl rim 557. In the depicted embodiment, the cross-section shows a first angle of bowl 554 extending from base 555 of bowl 554 to lip 556 of bowl 554 is greater than ninety degrees. Similarly, a second angle of channel 558 extending from base 555 of bowl 554 to lip 556 of bowl 554 is also greater than ninety degrees. In a preferred embodiment, the second angle of channel 558 is greater than the first angle of bowl 554, to optimize the slope for guiding the processed granular material out of the working surface of lid 550.

The depicted embodiment shows that a first volume of the working surface of lid 550 defined by base 555 of bowl 554 extending up to lip 556 of bowl 554 is housed within a second volume of external surface 552 defined by a bottom of external surface 552 extending up to bowl rim 557. The depicted embodiment includes a foundation element 551. The bottom of external surface 552 is determined by where external surface 552 meets foundation element 551, thereby defining an area enclosed by external surface 552. In a preferred embodiment, base 555 of bowl 554 does not extend into a volume defined by foundation element 551 so that foundation element 551 provides a solid and stable ground support.

Figure 6:
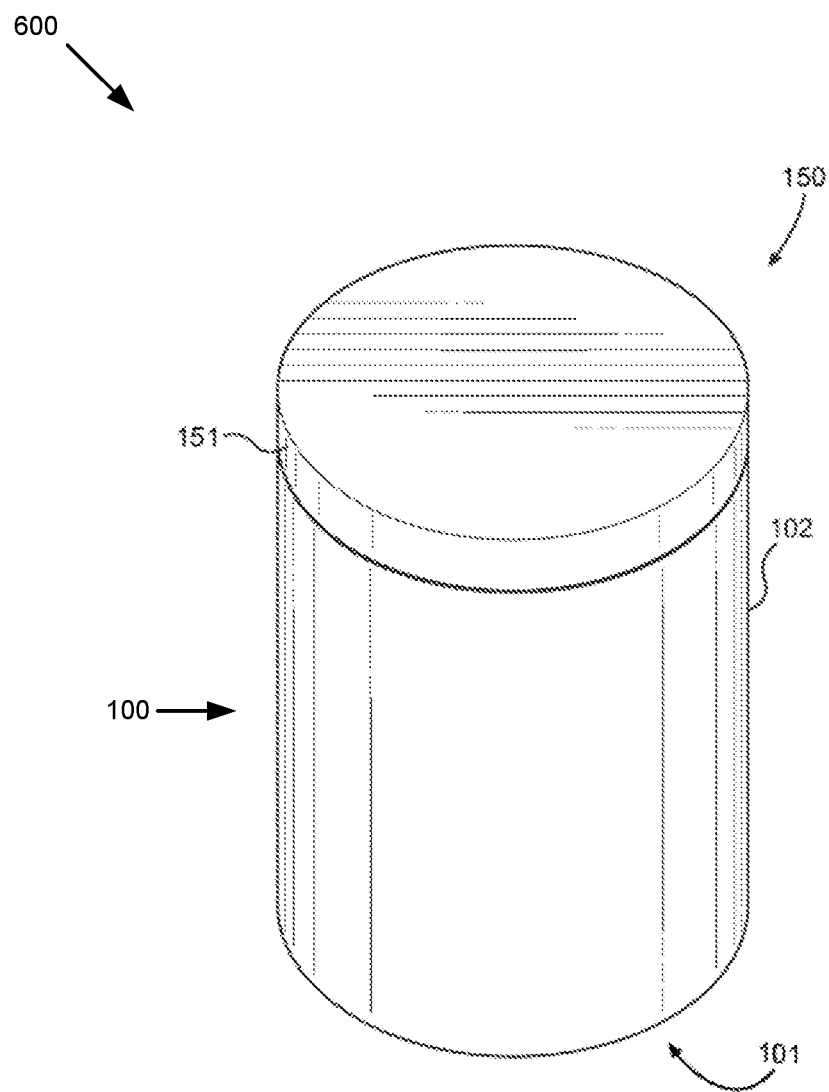
FIG. 6 shows another diagram of the exemplary system shown in FIG. 1, according to one embodiment of the present disclosure.

FIG. 6 shows another diagram of the exemplary system shown in FIG. 1, according to one embodiment of the present disclosure. In the depicted embodiment, system 600 is comprised of lid 150 removably installed in container 100. As depicted, only the foundation element 151 of the lid 150 is visible, and sidewall 102 extends upwards from base 101 of container 100. The depicted embodiment shows a circumference of foundation element 151 substantially equal to a circumference of sidewall 102 as the circumference surface of foundation element 151 appears to sit flush or completely level with the circumference surface of sidewall 102. In some embodiments, the circumference of foundation element 151 is greater than the circumference of sidewall 102. In some embodiments, the circumference of foundation element 151 is less than the circumference of sidewall 102. In the depicted embodiment, foundation element 151 is a substantially circular shape. In some embodiments, foundation element 151 is a different shape to facilitate different gripping points when user grasps lid 150 to remove from container 100 and to insert into container 100. In some embodiments circumference of base 101 is substantially equal to circumference of foundation element 151. In some embodiments circumference of container 100 is substantially equal throughout from base 101 to the top of sidewall 102. From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for storing and processing herbs comprising:
   a container having a base and one or more sidewalls extending upwards from the base and comprising an engagement interface at an upper end of the one or more sidewalls opposite the base, the base and one or more sidewalls defining a volume, the upper end of the one or more sidewalls defining an aperture; and
   a lid removably attached to the upper end of the one or more sidewalls, the lid covering the aperture when the system is in a closed configuration, the lid comprising:
   an outer portion comprising an external surface;
   an engagement element for interfacing with the container to form the removable attachment;
   an inner portion comprising a working surface, wherein the working surface comprises a bowl having a concave transition from a base of the bowl to a lip of the bowl, wherein the lip of the bowl is a convex transition between the bowl and a bowl rim, the bowl rim defining an intersection between the working surface and the external surface;
   and wherein the working surface further comprises a channel for guiding a processed granular material out of the bowl in a focused distribution stream, wherein the channel is a further recessed section of the working surface extending from a center of the working surface to the bowl rim, and wherein the channel is wider at the center of the working surface and tapers to be narrower at the bowl rim; and wherein the working surface faces inwardly towards the volume defined by the base and the one or more sidewalls when the container is in the closed configuration.

2. The system of claim 1, wherein the lid is circular, the base is circular, and the container is cylindrical.

3. The system of claim 1, wherein the working surface is smooth to prevent accumulation of build-up of residues from herbs processed on the working surface.

4. The system of claim 1, wherein the external surface of the lid includes an engagement element for engaging with the engagement interface of the one or more sidewalls by a complementary engagement mechanism.

5. The system of claim 4, wherein the complementary engagement mechanism is one of a threaded engagement, a friction-fit, a pressure-fit, a suction, a hinge, a latch, and a clamp.

6. The system of claim 4, wherein the engagement element is comprised of a gasket, wherein the gasket is one of a rubber material and a silicone material.

7. The system of claim 1, wherein the container and the lid are made of one of a wood, a metal, a glass, and a plastic.

8. The system of claim 1, wherein the lid further comprises a foundation element, wherein a surface area of a base of the foundation element is greater than a surface area of an area bounded by the external surface, and wherein the foundation element has one or more flat surfaces for providing stability when the lid is placed on a flat surface.

9. The system of claim 8, wherein the foundation element further comprises a gripping mechanism, wherein the gripping mechanism is one of a strip, a tape, and a sleeve.

10. The system of claim 9, wherein the gripping mechanism is made of a non-slip material, wherein the non-slip material is one of a rubber, a silicone, and a polyvinyl chloride.

11. A vessel for processing herbs, comprising:
an outer portion comprising an external surface;
an inner portion comprising a working surface, wherein the working surface comprises a bowl having a concave transition from a base of the bowl to a lip of the bowl, wherein the lip of the bowl is a convex transition between the bowl and a bowl rim, the bowl rim defining an intersection between the working surface and the external surface;
and wherein the working surface further comprises a channel for guiding a processed granular material out of the bowl in a focused distribution stream, wherein the channel is a further recessed section of the working surface extending from a center of the working surface to the bowl rim, and wherein the channel is wider at the center of the working surface and tapers to be narrower at the bowl rim.

12. The vessel of claim 11, further comprising a foundation element coupled to the outer portion, wherein a surface area of a base of the foundation element is greater than a surface area of a base of the outer portion, and wherein the foundation element has one or more flat surfaces for providing stability when the vessel is placed on a flat surface.

13. The vessel of claim 12, wherein the foundation element further comprises a gripping mechanism, wherein the gripping mechanism is one of a strip, a tape, and a sleeve.

14. The vessel of claim 13, wherein the gripping mechanism is made of a non-slip material, wherein the non-slip material is one of a rubber, a silicone, and a polyvinyl chloride.

15. A system for storing and processing herbs comprising:
a container having a base and one or more sidewalls extending upwards from the base and comprising an engagement interface at an upper end of the one or more sidewalls opposite the base, the base and one or more sidewalls defining a volume, the upper end of the one or more sidewalls defining an aperture; and
a lid removably attached to the upper end of the one or more sidewalls, the lid covering the aperture when the system is in a closed configuration, the lid comprising:
an outer portion comprising an external surface;
an engagement element for interfacing with the container to form the removable attachment;
an inner portion comprising a working surface, wherein the working surface comprises a bowl having a concave transition from a base of the bowl to a lip of the bowl, wherein the lip of the bowl is a convex transition between the bowl and a bowl rim, the bowl rim defining an intersection between the working surface and the external surface;
and wherein the working surface further comprises a channel for guiding a processed granular material out of the bowl in a focused distribution stream;
wherein the working surface faces inwardly towards the volume defined by the base and the one or more sidewalls when the container is in the closed configuration; and
a foundation element, wherein a surface area of a base of the foundation element is greater than a surface area of an area bounded by the external surface, and wherein the foundation element has one or more flat surfaces for providing stability when the lid is placed on a flat surface.

16. The system of claim 15, wherein the foundation element further comprises a gripping mechanism, wherein the gripping mechanism is one of a strip, a tape, and a sleeve.

17. The system of claim 16, wherein the gripping mechanism is made of a non-slip material, wherein the non-slip material is one of a rubber, a silicone, and a polyvinyl chloride.

* * * * *